(12) United States Patent  (10) Patent No.: US 8,670,381 B1
Houri  (45) Date of Patent: Mar. 11, 2014

(54) METHOD AND SYSTEM FOR ASCERTAINING PRESENCE OF AND/OR DETERMINING LOCATION OF MOBILE DEVICES IN A DEFINED AREA

(75) Inventor: Cyril Houri, Miami Beach, FL (US)

(73) Assignee: Mexens Intellectual Property Holding LLC, Miami Beach, FL (US)

( * ) Notice: Subject to any disclaimer, the term of this patent is extended or adjusted under 35 U.S.C. 154(b) by 271 days.

(21) Appl. No.: 12/909,638

(22) Filed: Oct. 21, 2010

(51) Int. Cl.
 *H04W 4/00* (2009.01)
 *H04L 29/08* (2006.01)
 *G08B 25/00* (2006.01)

(52) U.S. Cl.
 CPC .............. *H04L 67/18* (2013.01); *G08B 25/00* (2013.01)
 USPC ....................................... 370/328

(58) Field of Classification Search
 None
 See application file for complete search history.

(56) References Cited

U.S. PATENT DOCUMENTS

| | | | |
|---|---|---|---|
| 7,397,424 B2 * | 7/2008 | Houri | 342/357.31 |
| 7,696,923 B2 | 4/2010 | Houri | |
| 2008/0004798 A1 * | 1/2008 | Troxler et al. | 701/207 |
| 2008/0048856 A1 * | 2/2008 | Culpepper et al. | 340/539.13 |
| 2008/0268870 A1 | 10/2008 | Houri | |
| 2008/0274752 A1 | 11/2008 | Houri | |
| 2008/0275978 A1 * | 11/2008 | Houri | 709/223 |

* cited by examiner

*Primary Examiner* — Chi Pham
*Assistant Examiner* — Kouroush Mohebbi
(74) *Attorney, Agent, or Firm* — Brian Roffe

(57) ABSTRACT

Method for determining location of a wireless computing device in a defined area includes arranging at least one WiFi beacon relative to the defined area such that a wireless computing device in the defined area is detectable, causing each beacon to generate information about detection of a wireless computing device in the defined area, providing the generated information to a processor, and at the processor, determining a location of the wireless computing device in the defined area by processing the information generated by the beacon(s). The wireless computing device is not configured to send information to the processor so that the determination of the presence and/or location of the wireless computing device in the defined area is performed at the processor using only information provided by the beacon(s).

35 Claims, 3 Drawing Sheets

METHOD AND SYSTEM FOR ASCERTAINING PRESENCE OF AND/OR DETERMINING LOCATION OF MOBILE DEVICES IN A DEFINED AREA

FIELD OF THE INVENTION

The present invention relates generally to methods and systems for ascertaining the presence of and/or determining the location of a portable wireless computing device in a specific area.

BACKGROUND OF THE INVENTION

It is often desirable to ascertain the presence of and/or determine the location of a portable wireless computing device in a specific area, for example, to be able to contact a user thereof or determine whether the user is authorized to be in the area.

OBJECTS AND SUMMARY OF THE INVENTION

An object of the present invention is to provide methods and systems for ascertaining the presence of and/or determining the location of a portable wireless computing device in a specific or defined area.

A method for determining the location of a wireless computing device in a defined area in accordance with the invention includes arranging at least one WiFi beacon relative to the defined area such that a wireless computing device in the defined area is detectable, causing each beacon to generate information about detection of a wireless computing device in the defined area, providing the generated information to a processor, and at the processor, determining a location of the wireless computing device in the defined area by processing the information generated by the beacon(s).

A related system for determining the location of a wireless computing device in a defined area in accordance with the invention includes at least one WiFi beacon arranged relative to the defined area and a processor. Each beacon is configured to generate information about detection of a wireless computing device in the defined area and provide the generated information to the processor which determines a location of the wireless computing device in the defined area by processing the information generated by the beacon(s).

A method for monitoring wireless computing devices in a defined area, i.e., without necessarily determining the location of the wireless computing devices, in accordance with the invention includes arranging at least one WiFi beacon relative to the defined area such that a wireless computing device in the defined area is detectable, causing each beacon to generate information about detection of a wireless computing device in the defined area, providing the generated information to a processor, and at the processor, monitoring any wireless computing devices in the defined area by processing the information generated by the beacon(s) in order to determine which wireless computing devices are present in the defined area, whether a particular wireless computing device is in the defined area and/or whether a wireless computing device is not authorized to be in the defined area.

A related system for monitoring wireless computing devices in a defined area in accordance with the invention includes at least one WiFi beacon arranged relative to the defined area and a processor. Each beacon is configured to generate information about detection of a wireless computing device in the defined area and provide the generated information to the processor which monitors any wireless computing devices in the defined area by processing the information generated by the beacon(s) in order to determine which wireless computing devices are present in the defined area, whether a particular wireless computing device is in the defined area and/or whether a wireless computing device is not authorized to be in the defined area.

The wireless computing device presence ascertaining method and system may be used independent of or in combination with the wireless computing device location determining method and system.

Differing from prior art wireless computing device presence and location determining techniques, the wireless computing device is not configured to send information to the processor so that the determination of the presence and/or location of the wireless computing device in the defined area is performed at the processor using only information provided by the beacon(s).

Other and further objects, advantages and features of the present invention will be understood by reference to the following specification in conjunction with the annexed drawings.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
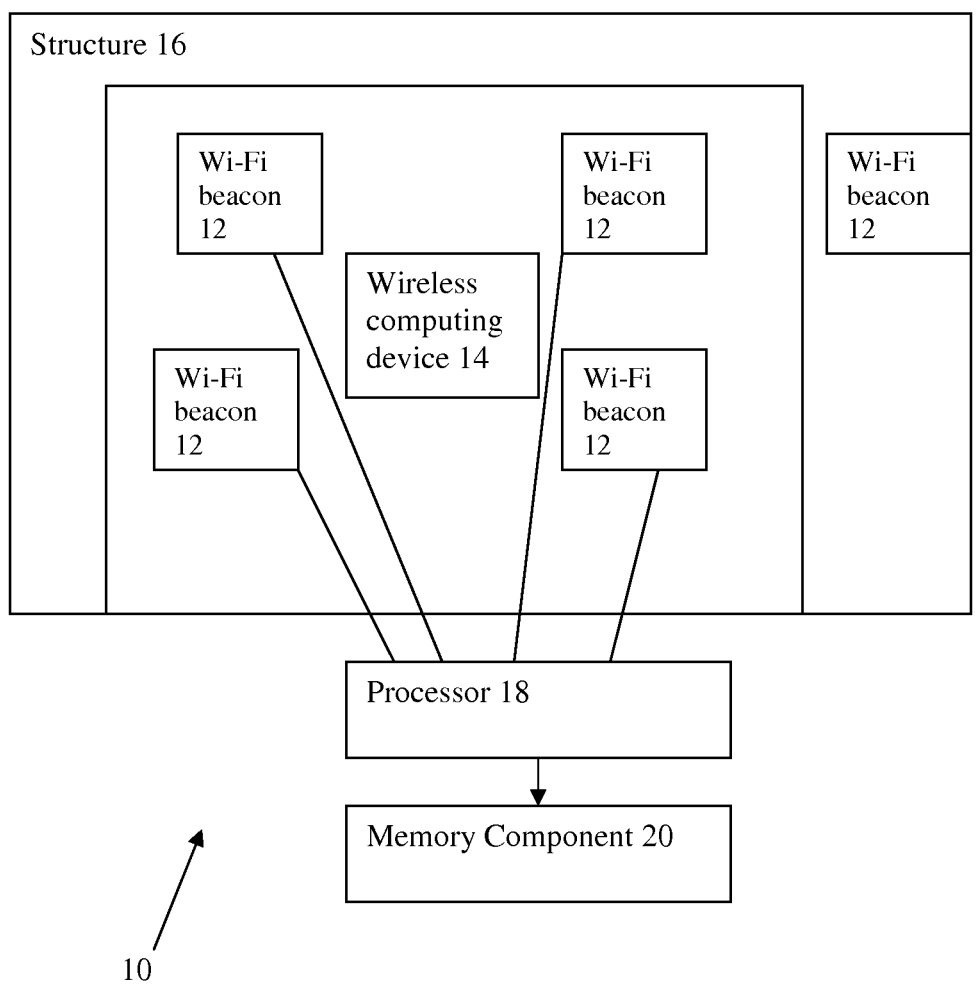
FIG. 1 is a schematic showing an environment in which methods and systems in accordance with the invention may be applied.

Referring to the accompanying drawings wherein like reference numbers refer to the same or similar elements, FIG. 1 shows an environment in which methods in accordance with the invention may be applied. The environment may be a defined area 10, i.e., any localized or specific area of interest, and which in a preferred implementation of the invention is an indoor or enclosed area. Examples of a defined area include a building, an indoor area of a building, a single floor or other portion of a building, a room of a building, and a portion of a room. A defined area thus encompasses any space limited, specified or defined by a user, with the objective to implement any of the methods described below in this area.

One method that may be implemented in defined area 10 is a method for determining the location of a wireless computing device, i.e., whether a wireless computing device is situated in the defined area 10 or not. To enable such a determination, one or more WiFi beacons 12 are arranged relative to the defined area 10 such that any wireless computing device 14 in the defined area 10 is detectable, when the wireless computing device 14 is activated (powered on). Although FIG. 1 shows five WiFi beacons 12 in defined area 10, even a single WiFi beacon 12 may be used to determine the location of a wireless computing device 14 in the defined area 10, but with less accuracy than if a plurality of WiFi beacons 12 were to be present.

The WiFi beacons 12 may be arranged in, within and/or around the defined area 10 such that the location of the wireless computing device 14 anywhere in the defined area 10 is detected by at least one WiFi beacon 12, this detection being essential for operability of the method as described below. The positions of the WiFi beacons 12 can vary depending on, for example, the configuration of the defined area 10, the operational and functional capabilities of the WiFi beacons 12 and the locations at which wireless computing devices 14 may be present in the defined area 10. When the defined area 10 is an interior space, one or more of the WiFi beacons 12 may be mounted into structure 16 defining the interior space (see the rightmost WiFi beacon 12 in FIG. 1).

In a preferred embodiment, the WiFi beacons 12 are controlled by an entity that monitors the defined area 10. They may be installed by this entity at fixed locations for the express purpose of implementing one or more of the methods in accordance with the invention.

When a wireless computing device 14 is active and present in the defined area 10, the WiFi beacons 12 generate information about detection of the wireless computing device 14 in a manner known to those skilled in the art. For example, the WiFi beacons 12 are configured to detect transmission of wireless packets from the wireless computing devices 14, and thus if the wireless computing device 14 is communicating, it is transmitting wireless packets with this transmission being detected by one or more of the WiFi beacons 12. This information generating step is designated 20 in FIG. 2.

Figure 2:
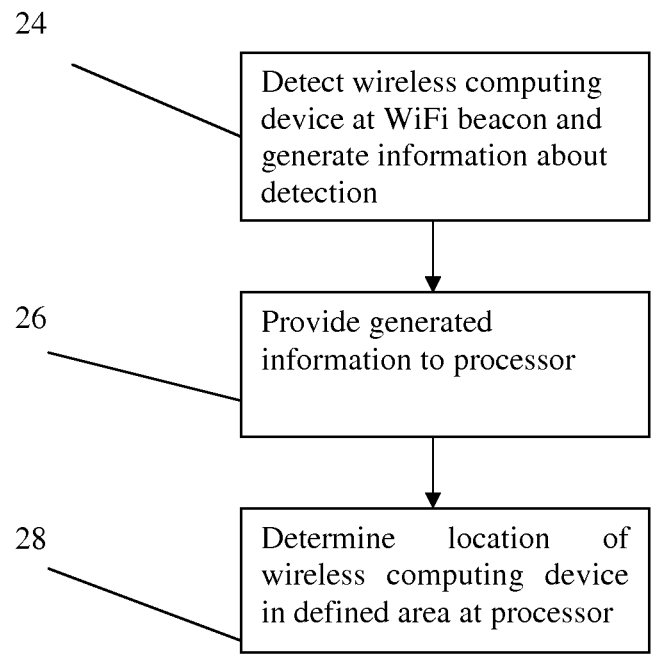
FIG. 2 is a flow chart of a wireless computing device location-determining method in accordance with the invention that is used in the environment shown in FIG. 1.

The information generated by the WiFi beacons 12 from the detection of a wireless computing device 14 is provided to a processor 18, step 26 in FIG. 2. Although shown outside of the defined area 10, processor 18 may be incorporated or included in or within the defined area 10, and may also be incorporated into or integral with one of the WiFi beacons 12. Thus, processor 12 may be part of a wireless beacon 12 or separate from all of the wireless beacons 12. Processor 18 may also be resident at a server with which the beacons 12 communicate.

At the processor 18, a location of the wireless computing device 14 in the defined area 10 is determined by processing the information generated and provided by the WiFi beacons 12, step 28 in FIG. 2.

A particular aspect of this method is that the wireless computing device 14 is not configured to send information to the processor 18 so that the determination of the location of the wireless computing device 14 in the defined area 10 is performed at the processor 18 using only information provided by the WiFi beacons 12, and specifically, information about detection of wireless transmissions from the wireless computing devices 14. This method can therefore function completely independent of transmissions from wireless computing devices to the location-determining processor, relying instead on information about detection of such a wireless computing device by one or more of the WiFi beacons 12.

As an example of this method, if a single WiFi beacon 12 is provided in defined area 10, then a transmission from a wireless computing device 14 that is detected by the WiFi beacon 12 can be processed into a determination that the wireless computing device is within the reception range of the WiFi beacon 12, i.e., within a circle with the WiFi beacon 12 at the center and having a radius of the reception limit of the WiFi beacon 12. The location of the WiFi beacon 12 is therefore determined to be within this circle. Since the position of the WiFi beacon 12 is known, the location of the wireless computing device 14 is also known relative to this position.

If two WiFi beacons 12 are provided in defined area 10, then a transmission from a wireless computing device 14 that is detected by both of these WiFi beacons 12 can be processed into a determination that the wireless computing device 14 is within the reception range of both WiFi beacons 12, i.e., within the intersecting area of two circles with the WiFi beacons 12 at a respective center and having a radius of the reception limit of the WiFi beacon 12. The location of the wireless computing device 14 is therefore determined to be within this intersecting area, a smaller area than in the case above.

If three WiFi beacons 12 are provided in defined area 10, then a transmission from a wireless computing device 14 that is detected by all of these WiFi beacons 12 can be processed into a determination that the wireless computing device is within the reception range of all three WiFi beacons 12, i.e., within the intersecting area of three circles with the WiFi beacons 12 at a respective center and having a radius of the reception limit of the WiFi beacon 12. The location of the wireless computing device is therefore determined to be within this intersecting area, a smaller area than in the case immediately above.

This implementation may serve as an indoor triangulation service, requiring at least three WiFi beacons 12 to determine the location of a wireless computing device 14.

As more WiFi beacons 12 are provided in association with the defined area 10 and each detects a transmission from the same wireless computing device 14, the area in which the wireless computing device 14 may be situated decreases thereby reducing the size of the area in which the wireless computing device 14 is located and increasing the precision of the location determination.

To associate transmissions detected by multiple WiFi beacons 12 with the same wireless computing device 14, identification information about the wireless computing device 14 is provided to the processor 18 along with the detection information. The processor 18 therefore receives a communication from each WiFi beacon 12 representing detection of a wireless computing device 14 with the identification thereof, which identification may be derivable from the detected transmission, i.e., from the wireless packets being transmitted to or from the wireless computing device 14.

Processor 18 applies a location determining algorithm, resident on computer-readable media accessible to the processor 18, using as input the locations of the WiFi beacons 12 that provide an indication of the detection of the same wireless computing device 14 when the location of that wireless computing device 14 is sought.

To this end, the method may be used to locate specific, known wireless computing devices, i.e., wireless computing devices 14 whose identification information is known. For example, a building manager may use the method to determine the location of a specific employee in the building or a hospital manager may use the method to determine the location of a specific doctor in the hospital.

To implement this capability, a memory component 20 is provided that is accessible to the processor 18 and stores identification information about wireless computing devices 14, such as the users assigned thereto or associated therewith. Memory component 20 may be managed by the administrator of the method.

When the location of a particular wireless computing device 14 is sought, i.e., the location of the user of the wireless computing device 14, memory component 20 is accessed to obtain an identification of the sought wireless computing device, and the detected transmissions from the WiFi beacons 12 are analyzed to find those beacons 12 that detect the sought wireless computing device 14 and then information about the detected transmissions is provided to the processor 18 which determines the location of the sought wireless computing device 14 therefrom.

As an alternative, instead of analyzing the information about detected transmissions from the WiFi beacons 12 provided to the processor 18, the processor 18 may be configured to direct commands to the WiFi beacons 12 to cause them to provide information about detection of transmissions from the sought wireless computing device, if present in the defined area, to the processor 18. The query from the processor 18 to each WiFi beacon 12 would be, e.g., whether the WiFi beacon 12 detects the sought wireless computing device 14. Then, based on the responses from those WiFi beacons 12 detecting the sought wireless computing device 14, the processor 18 would be able to determine the location of the wireless computing device 14.

As an example of this aspect, if the defined area 10 is a hospital and the location of an anesthesiologist is sought, the identification information of wireless computing devices for anesthesiologists at the hospital would be retrieved, e.g., from the memory component 20. Processor 18 would then direct commands to the WiFi beacons 12 to ascertain whether any WiFi beacon 12 is detecting transmissions from one of these wireless computing devices 14 and if so to provide information about the detection to the processor 18. The processor 18 then determines the location of the detected wireless computing device 14 in the defined area, and thus inherently also the presence thereof.

In an alternative embodiment, after the identification information of wireless computing devices for anesthesiologists at the hospital is retrieved, processor 18 could analyze information about all transmissions detected by the WiFi beacons 12 to ascertain whether any are from one of the wireless computing devices 14 identified as being associated with an anesthesiologist. If so, the processor 18 then determines the location of the detected wireless computing device 14 in the defined area, and thus inherently also the presence thereof.

The presence and location of a wireless computing device of an anesthesiologist is provided to the seeker, to enable, for example, the seeker to send a message to the anesthesiologist to go to a particular room in the hospital, treat a patient, call someone, etc. If multiple anesthesiologists are found to be in the defined area, the distance of the anesthesiologists relative to the location at which their services are needed may be considered when deciding which to send a message to.

A computer program resident on computer-readable medium may be resident at the processor to perform this method. This computer program would allow a hospital administrator access to identify a particular type of doctor sought, then automatically access the memory component 20 to obtain identification information about wireless computing devices 14 of that type of doctor, and then interact with the WiFi beacons 12 to obtain detection information to enable a presence and location determination of the wireless computing device. The computer program would also process the information provided by the WiFi beacons 12 and provide it to the hospital administrator in a form of their choosing, e.g., displaying it on a map of the defined area 10.

The WiFi beacons 12 may also provide signal strength information to the processor 18, i.e., information about the strength of signals between the WiFi beacons 12 and the wireless computing devices 14. Signal strength information may be used by the processor to improve the accuracy of the location determination.

Another use of the foregoing structure, i.e., the WiFi beacons 12 and processor 18, is as a security tool to monitor the presence of people in the defined area 10. The processor 18 is capable of providing identification information about wireless computing devices in the defined area 10, and associating previously identified wireless computing devices 14 with specific users. This method is not concerned with the location of the wireless computing devices 14 in the defined area 10, but simply the presence of the wireless computing devices 14 in the defined area 10, which presence may be considered to be authorized or unauthorized.

Figure 3:
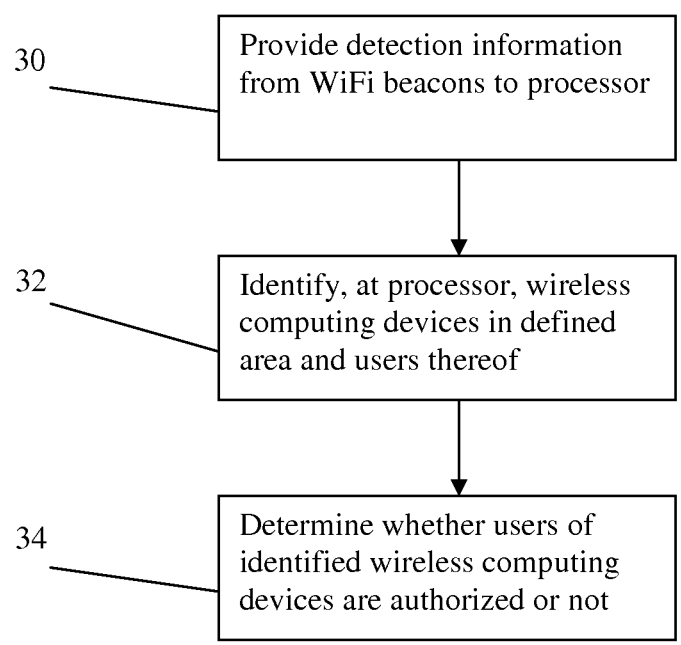
FIG. 3 is a flow chart of a wireless computing device presence-ascertaining method in accordance with the invention that is used in the environment shown in FIG. 1.

Referring to FIG. 3, in a method for monitoring a defined area in accordance with the invention using the environment illustrated in FIG. 1, the WiFi beacons 12 provide detection information about all wireless computing devices 14 in the defined area 10 to the processor 18, step 30. The processor 18 processes this information, and with possible reference to the memory component 20 associating users to wireless computing device identification information, generates a list of the users of the wireless computing devices 14 in the defined area, step 32. Any wireless computing device 14 that does not have identification information in the memory component 20 is considered to be an unknown user.

The processor 18 then analyzes the list to detect users that are not authorized to be in the defined area 10 and provides this information, for example, in the form of an alarm, to security personnel, step 34. This list would presumably include those wireless computing devices 14 for which identification information about their users is not contained in the memory component 20, i.e., the unknown users. Instead of actually creating a list, the processor 18 may be arranged to instantaneously analyze transmissions about each detected wireless computing device 14, based on the detection information provided by the WiFi beacons 12, and either consider the detected wireless computing device 14 to be authorized or unauthorized.

In either case, an authorized user would be one whose identification information of their wireless computing device 14 is available in the memory component 20 and the user has been previously authorized to be in the defined area 10, while an unauthorized user would be one whose identification information is available in the memory component 20 but the user is not authorized to be in the defined area 10 or one whose identification information is not available in the memory component 20.

The alarm may be provided by the processor 18 in any form or type, e.g., an e-mail or IM to a wireless computing device maintained by security personnel responsible for the security of the defined area 10.

The processor 18 might also maintain the list of authorized users, e.g., for presence verification purposes.

For any of the presence and location determination algorithms and processes described above, the techniques disclosed in U.S. Pat. Nos. 7,397,424 and 7,696,923, and U.S. patent application Ser. Nos. 12/167,649, 12/172,415 and 12/756,620, may be used. All of these patents and patent applications are incorporated by reference herein. In addition, the methods and systems disclosed herein may be used in combination with all of the methods and systems disclosed in these patents and patent applications.

Several computer programs resident on computer-readable medium may be used in the invention. Each WiFi beacon 12 may include a computer program that enables it to interact with the processor 18 and process the detection of transmissions by wireless computing devices 14 in its range, and respond to queries from the processor 18. The processor 18 also includes a computer program that coordinates the presence and location determinations and interactions with the WiFi beacons 12 and memory component 20.

In the context of this document, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A method for determining location of a wireless computing device in a defined area using at least one WiFi beacon fixed in a known position, the method comprising:
   detecting at the at least one WiFi beacon, transmissions of wireless packets from a wireless computing device in the defined area and that is movable relative to the at least one WiFi beacon;
   in response to detection of any transmissions to or from the wireless computing device in the defined area by the at least one beacon, generating information at the at least one beacon about the wireless computing device in the defined area, the information including an indication of detection of the wireless computing device in the defined area;
   providing the generated information from the at least one beacon to a processor;
   at the processor, determining a location of the wireless computing device in the defined area relative to a known position of the at least one beacon based on the information generated by the at least one beacon, identification information of the detected wireless computing device derived from the detected transmission, and information about the known position of each of the at least one beacon,
   whereby the wireless computing device is not configured to send information to the processor so that the determination of the location of the wireless computing device in the defined area is performed at the processor not based on information received from the wireless computing device;
   associating users of the computing devices to the wireless computing device identification information;
   analyzing the users associated with identification information about active wireless computing devices in the defined area and location information about active wireless computing devices in the defined area relative to a list of people authorized to be in the defined area to determine whether any of the users of the identified wireless computing devices located in the defined area is not authorized to be in the defined area; and
   generating an alarm when any of the users of the identified wireless computing devices located in the defined area is not authorized to be in the defined area.

2. The method of claim 1, wherein the at least one WiFi beacon comprises a plurality of WiFi beacons arranged relative to the defined area such that the location of a wireless computing device anywhere in the defined area is detected by the at least one of the plurality of WiFi beacons.

3. The method of claim 1, wherein the at least one WiFi beacon is within the defined area.

4. The method of claim 1, wherein the defined area is an interior space and the at least one beacon is mounted into structure defining the interior space.

5. The method of claim 1, further comprising:
   storing in a memory accessible to the processor, identification information about wireless computing devices;
   accessing the memory to obtain an identification of a wireless computing device whose location in the defined area is sought to be determined; and
   determining the location of the identified wireless computing device based on the information generated by the at least one beacon.

6. The method of claim 5, further comprising directing commands from the processor to the at least one beacon to cause the at least one beacon to provide information about detection of the identified wireless computing device, if present in the defined area, to the processor.

7. The method of claim 1, further comprising:
   storing the association of the users of the computing devices with the wireless computing device identification information in a memory component, the memory component being coupled to the processor such that the analysis of the users associated with identification information about active wireless computing devices in the defined area and location information about active wireless computing devices in the defined area relative to the list of people authorized to be in the defined area is performed at the processor.

8. The method of claim 1, wherein the identification information of the detected wireless computing device derived from the detected transmission is also generated at the at least one beacon such that the determination of the location of the wireless computing device in the defined area is performed at the processor using only information generated at and provided to the processor by the at least one beacon and the information about the known position of each of the at least one beacon.

9. The method of claim 1, further comprising:
   providing the processor with signal strength information, the signal strength information being provided from the at least one beacon and being information about strength of signals between the at least one beacon and the wireless computing device,
   the step of determining the location of the wireless computing device in the defined area at the processor comprising determining the location of the wireless computing device in the defined area based on the information generated by the at least one beacon, the identification information of the detected wireless computing device derived from the detected transmission, the information about the known position of each of the at least one beacon, and the signal strength information provided by the at least one beacon.

10. The method of claim 1, wherein the information generated at the at least one beacon about the wireless computing device in response to detection of any transmissions from the wireless computing device by the at least one beacon includes strength of signals being transmitted to or from the wireless computing device in the defined area.

11. A system for determining location of a wireless computing device in a defined area, comprising:
   at least one WiFi beacon arranged in a known position and such that transmissions of wireless packets from a wireless computing device in the defined area are detectable by said at least one beacon, the wireless computing device being movable relative to said at least one beacon when said at least one beacon is fixed at the known position, said at least one beacon being configured to generate, in response to detection of any transmissions to or from the wireless computing device in the defined area, information about the wireless computing device in the defined area, the information including an indication of detection of the wireless computing device in the defined area;
   a processor, said at least one beacon being configured to provide the generated information to said processor, said processor being configured to determine a location of the wireless computing device in the defined area relative to the known position of the at least one beacon based on the information generated by said at least one beacon, identification information of the detected wireless computing device derived from the detected transmission, and information about known position of each of said at least one beacon,
   whereby the wireless computing device is not configured to send information to said processor so that the determination of the location of the wireless computing device in the defined area is performed at said processor not based on information received from the wireless computing device; and
   a memory component in which users of the computing devices are associated with the wireless computing device identification information;
   said processor being configured to analyze the users associated with identification information about active wireless computing devices in the defined area and location information about active wireless computing devices in the defined area relative to a list of people authorized to be in the defined area obtained from said memory component to determine whether any of the users of the identified wireless computing devices located in the defined area is not authorized to be in the defined area, whereby an alarm is generatable when any of the users of the identified wireless computing devices located in the defined area is not authorized to be in the defined area.

12. The system of claim 11, wherein said at least one WiFi beacon comprises a plurality of WiFi beacons.

13. The system of claim 11, wherein said at least one beacon is arranged within the defined area.

14. The system of claim 11, wherein the defined area is an interior space defined by a structure, said at least one beacon being arranged in said structure defining the interior space.

15. The system of claim 11, wherein said processor is further configured to generate an indication that a particular wireless computing device whose presence in the defined area is sought to be determined is not in the defined area based on the information provided by said at least one beacon.

16. The system of claim 11, further comprising:
   a memory accessible to said processor and storing identification information about wireless computing devices, said processor being further configured to access said memory to obtain an identification of a wireless computing device whose location in the defined area is sought to be determined and determine the location of the identified wireless computing device based on the information generated by said at least one beacon.

17. The system of claim 16, wherein said processor is further configured to direct commands to said at least one beacon to cause said at least one beacon to provide information about detection of the identified wireless computing device, if present in the defined area, to said processor.

18. The system of claim 11, wherein said processor is separate from said at least one beacon.

19. The system of claim 11, wherein said processor is further configured to determine the location of the wireless computing device by obtaining identification and location information about said at least one beacon that has detected the wireless computing device and apply the obtained identification and location information into an algorithm resident on computer-readable media that provides the location of the wireless computing device.

20. The system of claim 11, wherein said at least one beacon is also configured to generate the identification information of the detected wireless computing device that is derived from the detected transmission such that the determination of the location of the wireless computing device in the defined area is performed at said processor using only information generated at and provided to said processor by said at least one beacon and the information about the known position of each of said at least one beacon.

21. The system of claim 11, wherein said at least one beacon is configured to provide said processor with signal strength information, the signal strength information being information about strength of signals between said at least one beacon and the wireless computing device,
   said processor being configured to determine the location of the wireless computing device in the defined area based on the information generated by said at least one beacon, the identification information of the detected wireless computing device derived from the detected transmission, the information about the known position of each of said at least one beacon, and the signal strength information provided by said at least one beacon.

22. The system of claim 11, wherein the information generated at said at least one beacon about the wireless computing device in response to detection of any transmissions from the wireless computing device by said at least one beacon includes strength of signals being transmitted to or from the wireless computing device in the defined area.

23. A method for monitoring wireless computing devices in a defined area using at least one WiFi beacon each in a known position, the method comprising:
   detecting at the at least one WiFi beacon, communications between a wireless computing device in the defined area and another communications device, the wireless computing device being movable relative to said at least one beacon when the at least one beacon is fixed at the known position;
   in response to detection of any communications involving the wireless computing device in the defined area by the at least one beacon, generating information at the at least one beacon about the wireless computing device in the defined area, the information including an indication of detection of the wireless computing device in the defined area;

providing the generated information from the at least one beacon to a processor;

at the processor, monitoring any wireless computing devices in the defined area based on the information generated by the at least one beacon, identification information of the detected wireless computing device derived from the detected communication, and information about the known position of each of the at least one beacon in order to determine which wireless computing devices are present in the defined area, whereby the wireless computing device is not configured to send information to the processor so that the determination of the presence of the wireless computing device in the defined area is performed at the processor not based on information received from the wireless computing device; and associating users of the computing devices to the wireless computing device identification information;

analyzing, at the processor, the users associated with identification information about active wireless computing devices in the defined area and location information about active wireless computing devices in the defined area relative to a list of people authorized to be in the defined area to determine whether any of the users of the identified wireless computing devices located in the defined area is not authorized to be in the defined area; and generating an alarm when any of the users of the identified wireless computing devices located in the defined area is not authorized to be in the defined area.

24. The method of claim 23, further comprising:

storing in a memory accessible to the processor, identification information about wireless computing devices;

accessing the memory to obtain an identification of a wireless computing device whose presence in the defined area is sought to be determined; and determining the presence of the identified wireless computing device based on the information generated by the at least one beacon.

25. The method of claim 23, further comprising:

directing commands from the processor to the at least one beacon to provide information about a specific wireless computing device detectable by the at least one beacon; and incorporating identification information about the specific wireless computing device into the commands being directed to the at least one beacon when the presence of the specific wireless computing device is sought;

analyzing the identification and location information about active wireless computing devices in the defined area to determine whether any of the identified wireless computing devices located in the defined area are not authorized to be in the defined area.

26. The method of claim 23, further comprising:

storing the association of the users of the computing devices with the wireless computing device identification information in a memory component, the memory component being coupled to the processor such that the analysis of the users associated with identification information about active wireless computing devices in the defined area and location information about active wireless computing devices in the defined area relative to the list of people authorized to be in the defined area is performed at the processor.

27. The method of claim 23, wherein the identification information of the detected wireless computing device derived from the detected communication is also generated at the at least one beacon such that the determination of the presence of the wireless computing device in the defined area is performed at the processor using only information generated at and provided by the at least one beacon and the information about the known position of each of the at least one beacon.

28. The method of claim 23, further comprising:

providing the processor with signal strength information, the signal strength information being provided from the at least one beacon and being information about strength of signals between the at least one beacon and the wireless computing device, the step of monitoring any wireless computing devices in the defined area comprising monitoring any wireless computing devices in the defined area based on the information generated by the at least one beacon, the identification information of the detected wireless computing device derived from the detected communication, the information about the known position of each of the at least one beacon and the signal strength information provided by the at least one beacon.

29. The method of claim 23, wherein the information generated at the at least one beacon about the wireless computing device in response to detection of any communications involving the wireless computing device by the at least one beacon includes strength of signals being transmitted to or from the wireless computing device in the defined area.

30. A system for monitoring wireless computing devices in a defined area using at least one WiFi beacon in a known position, the system comprising:

at least one WiFi beacon arranged in a known position and such that communications between a wireless computing device in the defined area and another communications device are detectable by said at least one beacon, the wireless computing device being movable relative to said at least one beacon when said at least one beacon is fixed at the known position, said at least one beacon being configured to generate, in response to detection of any communications involving the wireless computing device in the defined area, information about the wireless computing device in the defined area, the information including an indication of detection of the wireless computing device in the defined area;

a processor, said at least one beacon being configured to provide the generated information to said processor, said processor being configured to monitor any wireless computing devices in the defined area based on the information generated by said at least one beacon, identification information of the detected wireless computing device derived from the detected communication, and information about the known position of each of said at least one beacon in order to determine which wireless computing devices are present in the defined area, whereby the wireless computing device is not configured to send information to said processor so that the determination of the presence of the wireless computing device in the defined area is performed at said processor using not based on information received from the wireless computing device; and a memory component in which users of the computing devices are associated with the wireless computing device identification information;

said processor being configured to analyze the users associated with identification information about active wireless computing devices in the defined area and location information about active wireless computing devices in the defined area relative to a list of people authorized to be in the defined area obtained from said memory component to determine whether any of the users of the identified wireless computing devices located in the defined area is not authorized to be in the defined area, whereby an alarm is generatable when any of the users of the identified wireless computing devices located in the defined area is not authorized to be in the defined area.

31. The system of claim 30, further comprising:
a memory accessible to said processor and storing identification information about wireless computing devices, said processor being configured to access said memory to obtain an identification of a wireless computing device whose presence in the defined area is sought to be determined and determining the presence of the identified wireless computing device based on the information generated by said at least one beacon.

32. The system of claim 30, wherein said processor is further configured to direct commands to said at least one beacon to provide information about a specific wireless computing device detectable by said at least one beacon and incorporate identification information about the specific wireless computing device into the commands being directed to said at least one beacon when the presence of the specific wireless computing device is sought.

33. The system of claim 30, wherein said at least one beacon is also configured to generate the identification information of the detected wireless computing device that is derived from the detected communication such that the determination of the presence of the wireless computing device in the defined area is performed at said processor using only information generated at and provided by said at least one beacon and the information about the known position of each of said at least one beacon.

34. The system of claim 30, wherein said at least one beacon is configured to provide said processor with signal strength information, the signal strength information being information about strength of signals between said at least one beacon and the wireless computing device,
said processor being configured to monitor any wireless computing devices in the defined area based on the information generated by said at least one beacon, the identification information of the detected wireless computing device derived from the detected communication, the information about the known position of each of said at least one beacon, and the signal strength information provided by said at least one beacon.

35. The system of claim 30, wherein the information generated at said at least one beacon about the wireless computing device in response to detection of any communications involving the wireless computing device by said at least one beacon includes strength of signals being transmitted to or from the wireless computing device in the defined area.

* * * * *